United States Patent
Hong et al.

(10) Patent No.: US 11,296,768 B2
(45) Date of Patent: Apr. 5, 2022

(54) APPARATUS AND METHOD FOR ARRANGING BEAM IN WIRELESS COMMUNICATION SYSTEM

(71) Applicant: Samsung Electronics Co., Ltd., Suwon-si (KR)

(72) Inventors: Seongbeom Hong, Suwon-si (KR); Byungjoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/672,338

(22) Filed: Nov. 1, 2019

(65) Prior Publication Data

US 2020/0145078 A1 May 7, 2020

(30) Foreign Application Priority Data

Nov. 1, 2018 (KR) .................. 10-2018-0132871

(51) Int. Cl.
| | |
|---|---|
| *H04B 7/06* | (2006.01) |
| *H04B 7/0408* | (2017.01) |
| *H01Q 25/00* | (2006.01) |
| *H04W 16/28* | (2009.01) |
| *H04B 7/155* | (2006.01) |
| *H04W 72/04* | (2009.01) |

(52) U.S. Cl.
CPC ......... *H04B 7/0639* (2013.01); *H01Q 25/002* (2013.01); *H04B 7/0408* (2013.01);
(Continued)

(58) Field of Classification Search
CPC ... H04W 16/28; H04W 72/046; H04W 24/10; H04W 72/0446; H04W 8/24;
(Continued)

(56) References Cited

U.S. PATENT DOCUMENTS

| | | | |
|---|---|---|---|
| 9,294,163 B2 | 3/2016 | Kim | |
| 2013/0165050 A1* | 6/2013 | Kim | H04W 16/28 455/63.4 |

(Continued)

FOREIGN PATENT DOCUMENTS

KR 10-2013-0021919 A 3/2013

OTHER PUBLICATIONS

Mantash, Mohamad, et al., "Millimeter-Wave Beam-Steering Antenna Array for 5G Application," 2017 IEEE International Symposium on Antennas and Propagation & USNC/URSI National Radio Science Meeting, IEEE, 2017, 3 pages.
(Continued)

*Primary Examiner* — Zewdu A Kassa
*Assistant Examiner* — Sarah Hassan

(57) ABSTRACT

An apparatus and method for arranging a beam in a wireless communication system are provided. An electronic device includes a memory storing codebook information, a communication module operatively connected with the memory, and a processor operatively connected with the communication module and the memory. The processor is set to provide a first beam and a first beam set including beams surrounding the first beam on the basis of the codebook information, where centers of regions covered by the beams included in the first beam set substantially form an equilateral hexagon, and transceiver data by using the first beam and the first beam set.

11 Claims, 12 Drawing Sheets

(52) U.S. Cl.
CPC ....... *H04B 7/0617* (2013.01); *H04B 7/15514* (2013.01); *H04W 16/28* (2013.01); *H04W 72/046* (2013.01)

(58) Field of Classification Search
CPC ..... H04W 36/06; H04W 36/30; H04W 48/18; H04W 4/029; H04W 72/10
USPC .......................................................... 375/260
See application file for complete search history.

(56) References Cited

U.S. PATENT DOCUMENTS

| | | | |
|---|---|---|---|
| 2014/0113546 A1* | 4/2014 | Picard | H04B 7/18517 |
| | | | 455/12.1 |
| 2017/0201968 A1* | 7/2017 | Nam | H04W 72/042 |
| 2019/0115657 A1* | 4/2019 | Hwang | H04B 1/3838 |

OTHER PUBLICATIONS

Xu, Cheng, et al., "3D MIMO Radio Channel Modeling of a Weighted Linear Array System of Antennas for 5G Cellular Systems," 2016 International Conference on Telecommunications and Multimedia (TEMU), IEEE, 2016, 6 pages.

Zhang, Jing, et al., "5G Millimeter-Wave Antenna Array: Design and Challenges," IEEE Wireless Communications, Apr. 2017, 7 pages.

"Antenna Theory—Beam Width," www.tutorialspoint.com, Nov. 1, 2019, 3 pages.

* cited by examiner

APPARATUS AND METHOD FOR ARRANGING BEAM IN WIRELESS COMMUNICATION SYSTEM

CROSS-REFERENCE TO RELATED APPLICATION

This application is based on and claims priority under 35 U.S.C. § 119 to Korean Patent Application No. 10-2018-0132871, filed on Nov. 1, 2018, in the Korean Intellectual Property Office, the disclosure of which is incorporated by reference herein in its entirety.

BACKGROUND

1. Field

The disclosure of various embodiments relates to an apparatus and method for arranging a beam in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

The above information is presented as background information only to assist with an understanding of the present disclosure. No determination has been made, and no assertion is made, as to whether any of the above might be applicable as prior art with regard to the present disclosure.

SUMMARY

In wireless communication using a high frequency, it can be required to form a directive beam on the basis of a high loss rate of the high frequency. An electronic device can form a directive beam by using an antenna array including a plurality of antennas, but may fail to cover a coverage region efficiently.

Various embodiments of the present disclosure are to provide a beamforming method for providing a radiation direction of a beam in order to efficiently cover an area of a predetermined size by using a small number of beams, and an electronic device thereof.

An electronic device of various embodiments includes an antenna array configured to include a plurality of conductive members, a wireless communication circuitry configured to be electrically connected with the plurality of conductive members, and transmit and/or receive a signal having a frequency between 3.5 GHz and 70 GHz, and form a directive beam radiated in a set direction by using the antenna array, at least one processor configured to be operatively connected to the wireless communication circuitry, and a memory configured to be operatively connected with the at least one processor. The memory may store information about radiation directions of a plurality of directive beams that will be radiated through the antenna array. The memory may store instructions of, at execution, enabling the processor to control the antenna array to radiate the respective plurality of directive beams in radiation directions corresponding to mutually different times, on the basis of the information about the radiation directions of the plurality of directive beams. The information about the radiation directions of the plurality of directive beams may be acquired by hexagonally providing coverage regions covered by the respective plurality of directive beams, and providing the number of beam sets wherein the coverage regions covered by the plurality of directive beams are combined to include a target coverage region that the electronic device intends to cover, and on the basis of the provided number of beam sets, setting the number of the plurality of directive beams and the radiation directions of the plurality of directive beams.

According to various embodiments, a method for setting radiation directions of a plurality of directive beams radiated in an electronic device may include acquiring information about a target coverage region which is expressed as a partial region on a hemisphere distant a first distance away centering on an antenna array of the electronic device, and providing, in a hexagonal shape, a coverage region covered by a directive beam formed by a wireless communication circuitry and providing the number of beam sets wherein coverage regions covered by a plurality of directive beams formed by the wireless communication circuitry are combined to include the target coverage region, and setting the number of the plurality of directive beams and the radiation direction of each of the plurality of directive beams, on the basis of the provided number of beam sets.

An apparatus and method of various embodiments of the present disclosure may decrease the number of beams for covering an area of the same size, by arranging radiation directions of beams to form in an equilateral hexagon structure.

An apparatus and method of various embodiments of the present disclosure may increase a size of an area to cover using the same number of beams, by arranging a radiation direction of a beam in an equilateral hexagon structure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure are used to just explain a specific embodiment, and may not intend to limit the scope of another embodiment. The expression of a singular form may include the expression of a plural form unless otherwise dictating clearly in context. The terms used herein inclusive of technological or scientific terms may have the same meaning as those commonly understood by a person having ordinary skill in the art mentioned in the present disclosure. Among the terms used in the present disclosure, the terms defined in a general dictionary may be interpreted as the same or similar meanings as the contextual meanings of a related technology, and are not interpreted as ideal or excessively formal meanings unless defined clearly in the present disclosure. According to cases, even the term defined in the present disclosure may not be construed to exclude embodiments of the present disclosure.

In various embodiments of the present disclosure described below, a hardware access method is described as an example. However, various embodiments of the present disclosure include a technology that uses both hardware and software and therefore, various embodiments of the present disclosure do not exclude a software based access method.

Below, the present disclosure relates to an apparatus and method for arranging a radiation direction of a beam in a wireless communication system. In detail, the present disclosure explains a technology for arranging directions of radiated beams on the basis of an equilateral hexagon structure in a wireless communication system.

Figure 1:
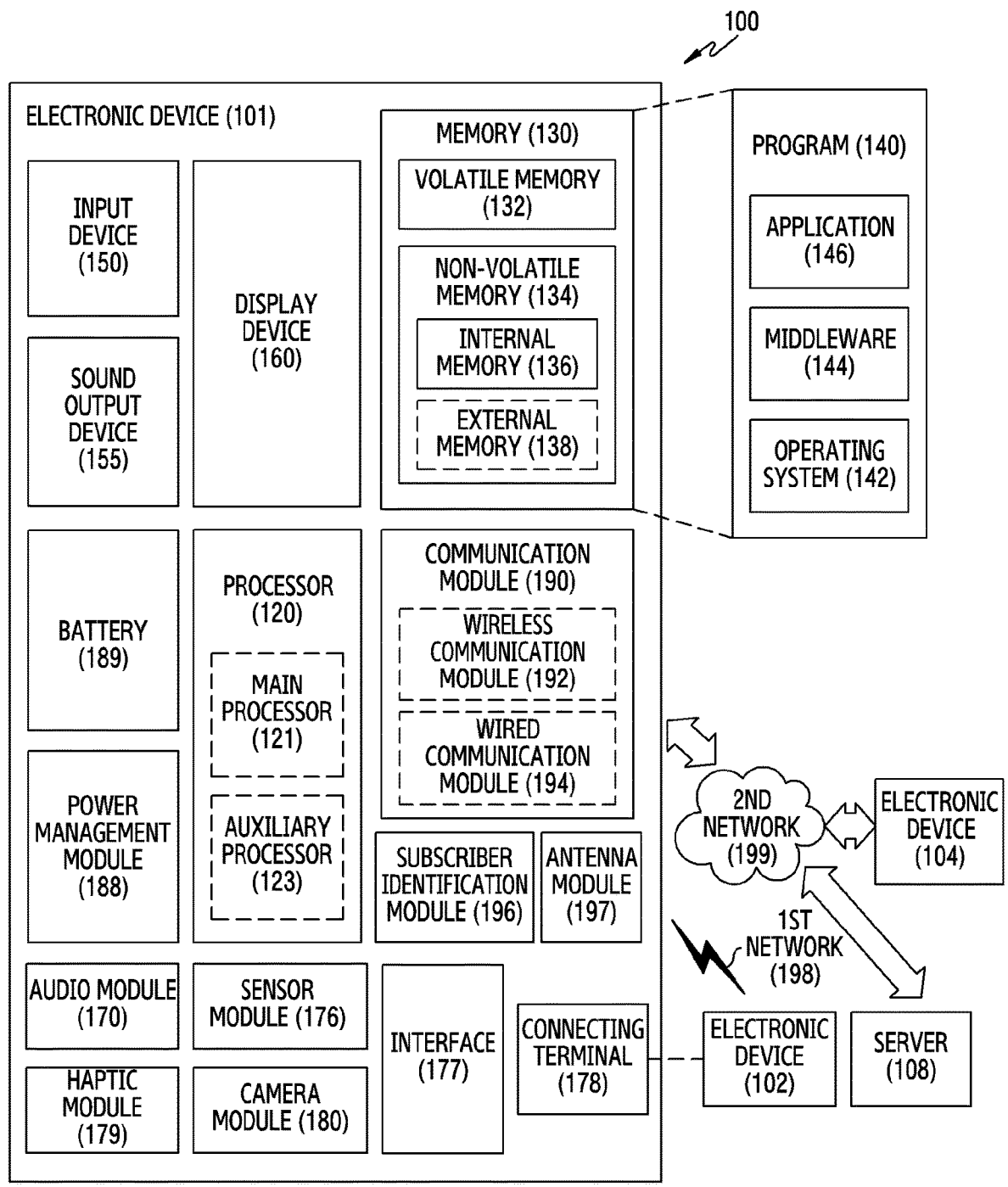
FIG. 1 illustrates a block diagram of an electronic device within a network environment according to various embodiments.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
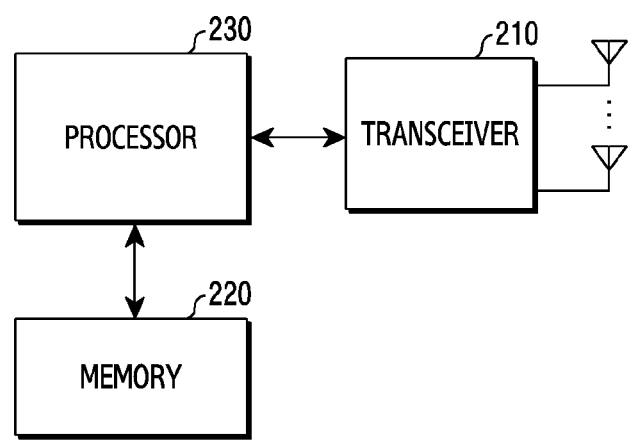
FIG. 2 illustrates a functional construction of an electronic device in a wireless communication system according to various embodiments.

FIG. 2 illustrates a functional construction of an electronic device in a wireless communication system according to various embodiments. The construction exemplified in FIG. 2 may be understood as a construction of the electronic device 200. The terms ' . . . unit', ' . . . er', etc. used below represent the unit of processing at least one function or operation. This may be implemented as hardware or software, or a combination of hardware and software.

The electronic device 200 illustrated in FIG. 2 may correspond to, for example, the electronic device 101 illustrated in FIG. 1.

Referring to FIG. 2, the electronic device 200 of various embodiments may include a transceiver 210, a memory 220, and/or a processor 230.

In accordance with various embodiments, the memory 220 and the processor 230 illustrated in FIG. 2 may correspond to the memory 130 and the processor 120 illustrated in FIG. 1, respectively, and the transceiver 210 may correspond to the communication module 190 of FIG. 1 or be a part thereof.

According to an embodiment, the transceiver 210 may perform functions for transceiving a signal through a wireless channel. For example, the transceiver 210 may perform a function of conversion between a baseband signal and a bit stream in compliance with the physical layer standard of a system. For example, at data transmission, the transceiver 210 may provide complex symbols by encoding and modulating a transmission bit stream. Also, at data reception, the transceiver 210 may restore a reception bit stream by demodulating and decoding a baseband signal. Also, the transceiver 210 may up convert a baseband signal into a radio frequency (RF) band signal and then transmit the RF band signal through an antenna, and down convert an RF band signal received through the antenna into a baseband signal. For example, the transceiver 210 may include a transmission filter, a reception filter, an amplifier, a mixer, an oscillator, a digital to analog converter (DAC), and/or an analog to digital converter (ADC).

According to an embodiment, the transceiver 210 may include a plurality of transceiving paths. The transceiver 210 may include at least one antenna array formed with a plurality of antenna elements. In aspect of hardware, the transceiver 210 may be formed with a digital circuitry and an analog circuitry (e.g., radio frequency integrated circuit (RFIC)). For example, the digital circuitry and the analog circuitry may be implemented as one package. For another example, the transceiver 210 may include a plurality of RF chains. The transceiver 210 may perform beamforming.

According to an embodiment, to process mutually different frequency-band signals, the transceiver 210 may include mutually different communication modules. For another example, to support a plurality of mutually different wireless connection technologies, the transceiver 210 may include a plurality of communication modules. For example, the mutually different wireless connection technologies may include Bluetooth low energy (BLE), wireless fidelity (WiFi), WiFi gigabyte (WiGig), and/or a cellular network (e.g., long term evolution (LTE)). In an embodiment, mutually different frequency bands may include a super high frequency (SHF) (e.g., 2.5 GHz or 5 GHz) band, or a millimeter (mm) wave (e.g., 60 GHz) band.

As mentioned above, the transceiver 210 may transmit and receive a signal. According to this, the entire or part of the transceiver 210 may be denoted as a 'transmitting unit', a 'receiving unit' or a 'communication unit'. Also, in the following description, transmission and reception performed through a wireless channel may be used as a meaning including that the aforementioned processing is performed by the transceiver 210.

Referring to FIG. 2, the memory 220 may store data such as a basic program for an operation of the electronic device 200, an application program, and/or setting information. The memory 220 may be formed with a volatile memory, a non-volatile memory, or a combination of the volatile memory and the non-volatile memory. The memory 220 may provide stored data according to a request of the processor 230.

In accordance with an embodiment, the memory 220 may store azimuth angle information. The azimuth angle information may include information of azimuth angles allocated according to a beam set. The azimuth angle may be provided as an angle which is formed with a reference vector (for example, an x axis on an x-y plane) residing on a reference plane by projecting a vector from the origin to a target vertically (for example, a z-axis direction) to the reference plane (for example, the x-y plane) in a spherical coordinate system. The beam set may include a plurality of beams. The plurality of beams included in one beam set may be formed to be radiated at different azimuth angles. Also, an azimuth angle interval between neighboring beams may be constant.

TABLE 1

| Beam set number | Number of beams included in beam set | Azimuth angle interval between neighboring beams | Azimuth angle allocated to each beam |
|---|---|---|---|
| 1 | 6 | 60° | 0°, 60°,120°, 180°, 240°, 300° |
| 2 | 12 | 30° | 0° 30°, 60°, 90° . . . 300°, 330° |

TABLE 1-continued

| Beam set number | Number of beams included in beam set | Azimuth angle interval between neighboring beams | Azimuth angle allocated to each beam |
|---|---|---|---|
| 3 | 18 | 20° | 0°, 20°, 40°, 60° ... 320°, 340° |
| ... | ... | ... | ... |
| N | 6*N | $\frac{360}{6*N}° = \frac{60}{N}°$ | $0°, \frac{60}{N}°, 2*\frac{60}{N}°, 3*\frac{60}{N}° \ldots$ $(6*N-2)\frac{60}{N}°,$ $(6*N-1)\frac{60}{N}°$ |

Table 1 above may include information about the number of a plurality of beams included in each beam set, an interval of an azimuth angle between neighboring beams among the plurality of beams, and/or an azimuth angle allocated to each of the plurality of beams. The memory 220 may store, in the form of a table, information about the beam set, the number of the plurality of beams included in the beam set, the azimuth angle interval between the neighboring beams among the plurality of beams, and the azimuth angle allocated to each of the plurality of beams.

In accordance with an embodiment, the beam set may correspond to a set including a plurality of beams. The plurality of beams included in one beam set may be radiated at different azimuth angles, respectively. Also, the plurality of beams included in the one beam set may be formed to be radiated on the slant on the basis of the same elevation angle.

In accordance with another embodiment, the number of the plurality of beams included in the beam set, the azimuth angle interval between the neighboring beams, and the azimuth angle allocated to each of the plurality of beams may be provided on the basis of a beam set number. For example, the number of a plurality of beams included in the Nth beam set may correspond to 6*N. An azimuth angle interval between neighboring beams among the plurality of beams may correspond to $$\frac{360°}{6*N} = \frac{60°}{N}$$

wherein the plurality of beams are formed to have the same azimuth angle interval over 360°. Referring to Table 1 above, a first beam set may include six beams, and beams adjacent to the six beams may be formed to have an azimuth angle interval of 60°. For example, the six beams may be formed to be radiated at azimuth angles of 0°, 60°, 120°, 180°, 240°, and 300°, respectively.

In accordance with various embodiments, referring to Table 1 above, the memory 220 may forward, to the processor 230, information about azimuth angles at which the plurality of beams may be radiated. The memory 220 may receive a request for the information about the beam set from the processor 230. In response to the request for the information about the beam set, the memory 220 may forward the information about the plurality of beams to the processor 230. For example, when the information about the beam set requested from the processor 230 corresponds to '1', the memory 220 may forward information indicating that six beams may be radiated at azimuth angles of 0°, 60°, 120°, 180°, 240°, and 300°, respectively, in that a first beam set includes the six beams and is radiated at an interval of 60° with reference to the first row of Table 1 above. For another example, when the information about the beam set requested from the processor 230 corresponds to '2', the memory 220 may forward, to the processor 230, information indicating that six beams may be radiated at the azimuth angles of 0°, 60°, 120°, 180°, 240°, and 300°, respectively, and twelve beams may be radiated at azimuth angles of 0°, 30°, 60°, 90°, . . . , 300°, and 330°, respectively, in that the first beam set includes the six beams and is radiated at the interval of 60° and a second beam set includes twelve beams and is radiated at an interval of 30° with reference to the first row and the second row of Table 1 above.

The memory 220 may store codebook information which includes codewords representing information about a direction in which a beam is radiated. The codebook information may be provided by the processor 230 as well, but may acquire and store codebook information provided in an external device as well. The respective codewords included in the codebook information may correspond to elevation angle and azimuth angle information in which a beam can be radiated. In an embodiment, a first codeword may correspond to a direction having an elevation angle of 0° and an azimuth angle of 0°, and a second codeword may correspond to a direction having an elevation angle of 30° and an azimuth angle of 60°.

The processor 230 may control general operations of the electronic device 200. For example, the processor 230 may control to transmit and receive a signal through the transceiver 210. For another example, the processor 230 may control to write data in the memory 220, and read. For further another example, the processor 230 may perform functions of a protocol stack required in the communication standard. In an embodiment, part of the transceiver 210 and the processor 230 may be denoted as a communication processor (CP). For example, the processor 230 may control the electronic device 101 to perform operations of various embodiments described later.

Figure 3A:
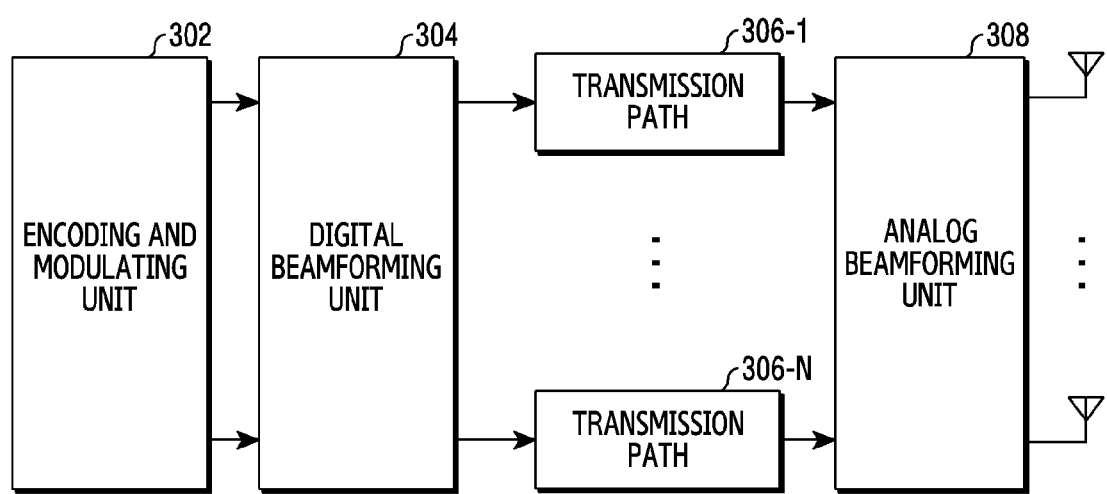
FIG. 3A to FIG. 3B illustrate a construction of a transceiver in a wireless communication system according to various embodiments.
Figure 3B:
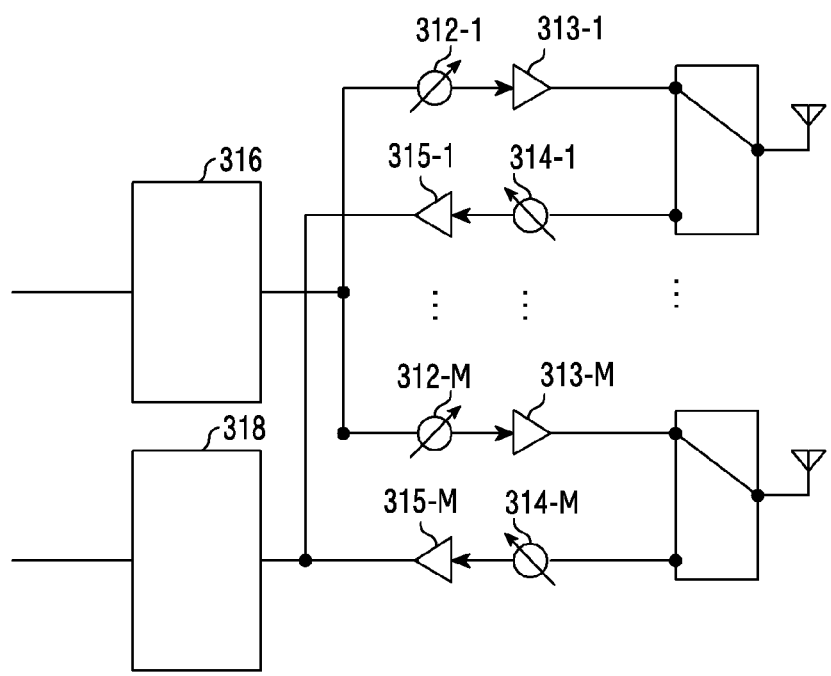

FIG. 3A to FIG. 3B illustrate a construction of a transceiver in a wireless communication system according to various embodiments. FIG. 3A to FIG. 3B illustrate an example of a detailed construction of the antenna module 197 of FIG. 1 or the transceiver 210 of FIG. 2. FIG. 3A to FIG. 3B exemplify constituent elements for performing beamforming, as part of the antenna module 197 of FIG. 1 or the transceiver 210 of FIG. 2.

Referring to FIG. 3A, the transceiver 300 may include an encoding and modulating unit 302, a digital beamforming unit 304, a plurality of transmission paths 306-1 to 306-N, and an analog beamforming unit 308.

In accordance with various embodiments, the encoding and modulating unit 302 may perform channel encoding. For the channel encoding, at least one of a low density parity check (LDPC) code, a convolution code, or a polar code may be used. By performing constellation mapping, the encoding and modulating unit 302 may provide modulation symbols.

In accordance with various embodiments, the digital beamforming unit 304 may perform the beamforming of a digital signal (e.g., modulation symbols). For this, the digital beamforming unit 304 multiplies modulation symbols by beamforming weights. The beamforming weights, which are used to alter a magnitude and phase of a signal, may include a 'precoding matrix' and/or a 'precoder'. The digital beamforming unit 304 may output the digital-beamformed modulation symbols to the plurality of transmission paths 306-1 to 306-N. At this time, the modulation symbols may be multiplexed according to a multiple input multiple output (MIMO) transmission technique, or the same modulation symbols may be provided to the plurality of transmission paths 306-1 to 306-N according to a transmission diversity technique.

In accordance with various embodiments, the plurality of transmission paths 306-1 to 306-N may convert the digital-beamformed digital signals into an analog signal. For this, each of the plurality of transmission paths 306-1 to 306-N may include an inverse fast Fourier transform (IFFT) operation unit, a cyclic prefix (CP) inserting unit, a DAC, and/or an up converting unit. The CP inserting unit, which is for an orthogonal frequency division multiplexing (OFDM) scheme, may be excluded when other physical layer schemes (e.g., filter bank multi-carrier (FBMC)) are applied. For instance, the plurality of transmission paths 306-1 to 306-N may provide an independent signal processing process for a plurality of streams provided through digital beamforming. In an embodiment, in accordance with an implementation scheme, some of constituent elements of the plurality of transmission paths 306-1 to 306-N may be used for common use.

In accordance with various embodiments, the analog beamforming unit 308 may perform beamforming for an analog signal. For this, the analog beamforming unit 306 may multiply analog signals by beamforming weights. Here, the beamforming weights are used to alter a magnitude and phase of a signal. For example, in accordance with a connection structure between the plurality of transmission paths 306-1 to 306-N and antennas, the analog beamforming unit 308 may, as in FIG. 3B, be formed for one transmission path (e.g., 306-1 to 306-N).

Referring to FIG. 3B, signals inputted to the analog beamforming unit 308 from one transmission path (e.g., 306-1 or 306-N) may go through phase/magnitude transformation and/or amplification operation, and be transmitted through the antennas. At this time, a signal of each transmission path may be transmitted through mutually different antenna sets, that is, antenna arrays.

In accordance with various embodiments, a splitter 316 may split a transmission signal into the same signals of the number of mutually different antennas. An inputted signal may be transformed into a signal having mutually different or same phase by phase transformation units 312-1 to 312-M and be amplified by amplifiers 313-1 to 313-M, and then be transmitted through the antennas.

In accordance with various embodiments, signals received through the antennas may be transformed by phase transformation units 314-1 to 314-M and be amplified by amplifiers 315-1 to 315-M and then, be combined into one signal by a combiner 318 and then be forwarded to the processor 230 through a non-shown reception path.

Figure 4A:
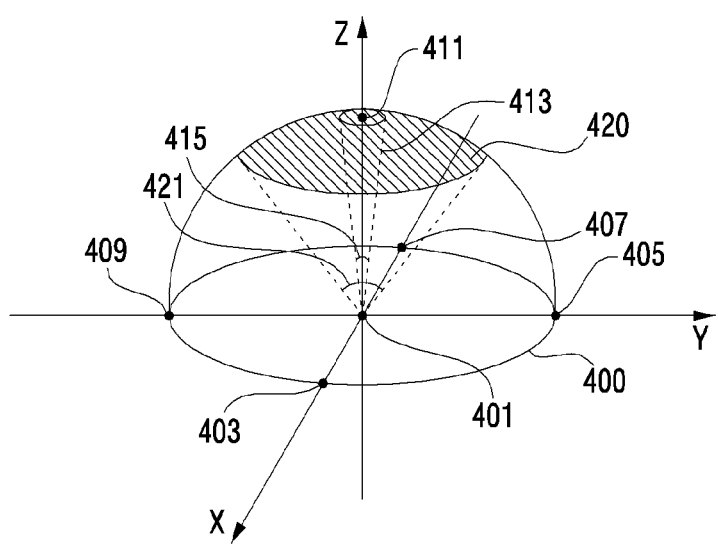
FIG. 4A illustrates a perspective view of beamforming of an electronic device in a wireless communication system according to various embodiments.

FIG. 4A illustrates a perspective view of beamforming of an electronic device in a wireless communication system according to various embodiments.

The electronic device 101 illustrated in FIG. 4A may, for example, correspond to the electronic device 101 illustrated in FIG. 1.

Referring to FIG. 4A, the electronic device 101 of various embodiments may form a beam. The electronic device 101 may form the beam through a free space.

In accordance with various embodiments, the electronic device 101 may be positioned in a center point 401 of a hemisphere 400. The hemisphere 400 may denote a three-dimensional region that a beam emitted from the electronic device 101 can reach.

In various embodiments, the hemisphere 400 may be expressed as a spherical coordinate system. All points on the hemisphere 400 may be expressed using a combination of an azimuth angle and an elevation angle. The azimuth angle may be provided as an angle (i.e., an angle formed by rotating counterclockwise from an x axis on an x-y plane) which is formed with a reference vector (for example, the x axis on the x-y plane) residing on a reference plane by projecting a vector from the origin to a target vertically (for example, a z-axis direction) to the reference plane (for example, the x-y plane) in the spherical coordinate system. The elevation angle may be provided as an angle which is formed between a vector from the origin to a target in the spherical coordinate system and an axis (for example, a z axis) vertical to the reference plane (for example, the x-y plane). The elevation angle may be denoted as a down-viewed angle or a zenith angle as well.

All points on the hemisphere 400 may be expressed as a coordinate of (azimuth angle, elevation angle). For example, points at which an x axis and the hemisphere 400 are intersected may correspond to a point 403 and a point 407. The point 403 may be expressed as (0°, 90°), and the point 407 may be expressed as (180°, 90°). For another example, points at which a y axis and the hemisphere 400 are intersected may correspond to a point 405 and a point 409. The point 405 may be expressed as (90°, 90°), and the point 409 may be expressed as (270°, 90°).

In accordance with various embodiments, the electronic device 101 may form a first beam 413 radiated toward a zenith 411 on the hemisphere 400. In an antenna radiation pattern emitted from the transceiver 210 of the electronic device 101, the first beam 413 may correspond to a main lobe. The zenith 411 may be expressed as (0°, 0°). In accordance with various embodiments, the zenith 411 may correspond to a center point of a target coverage region 420. The target coverage region 420 may denote a region which is covered by beams formed by the electronic device 101. In accordance with various embodiments, the target coverage region 420 may be defined as a combination of distance information distant away from the electronic device 101, information about a center point of target coverage, and a target coverage angle 421. The target coverage angle 421 may denote an angle which is formed between two points, which are distant away by an azimuth angle of 180° among boundary points of the target coverage region 420, and the origin 401.

Figure 4B:
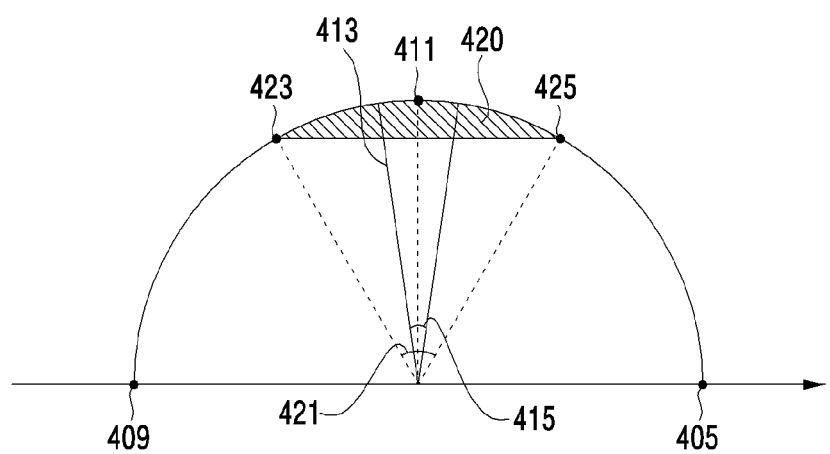
FIG. 4B illustrates a front view of beamforming of an electronic device in a wireless communication system according to various embodiments.

FIG. 4B illustrates a front view of beamforming of an electronic device in a wireless communication system according to various embodiments.

Referring to FIG. 4B, the target coverage angle 421 may denote an angle which is formed with a point 423 and a point 425, which are both end points of the target coverage region 420, and the origin 401. For example, when the point 423 corresponds to (270°, 30°) and the point 425 corresponds to (90°, 30°), the target coverage angle 421 formed with the origin 401 and the both end points may correspond to 60°.

In accordance with various embodiments, by forming a first beam 413 to be radiated toward the zenith 411, the electronic device 101 may cover at least a partial region of the target coverage region 420. The at least partial region may be provided through a beam width 415.

In an embodiment, the beam width 415 may denote an angle between two points having a gain of −3 dB (half power) with respect to a maximum radiation direction of a main lobe. The beam width 415 is illustrated as having the gain of −3 dB with respect to the maximal radiation direction of the main lobe, but an embodiment is not limited to this. For example, when the beam width 415 denotes an angle between two points having a gain of −10 dB with respect to the maximal radiation direction of the main lobe, the at least partial region that the first beam 413 can cover may increase in size. That is because a point at which power is decreased by −10 dB can be distant away from the zenith 411. Accordingly, when the angle between the two points having the gain of −10 dB is set with the beam width, the beam width 415 may more increase than when being set with the gain of −3 dB. For another example, when the beam width 415 is set as an angle between two points having a gain of −1 dB with respect to the maximal radiation direction of the main lobe, the at least partial region that the first beam 413 can cover may decrease in size. That is because a point at which power is decreased by −1 dB gets close to the zenith 411. Accordingly, when the beam width is set with the angle between the two points having the gain of −1 dB, the beam width 415 may more decrease than when being set with the gain of −3 dB.

According to various embodiments, an electronic device (e.g., the electronic device 101) may include an antenna array configured to include a plurality of conductive members, a wireless communication circuitry 210 or 300 configured to be electrically connected with the plurality of conductive members, and transmit and/or receive a signal having a frequency between 3.5 GHz and 70 GHz, and form a directive beam radiated in a set direction by using the antenna array, at least one processor 120 or 230 configured to be operatively connected to the wireless communication circuitry 210 or 300, and a memory 130 or 220 configured to be operatively connected with the at least one processor. The memory 130 or 220 may store information about radiation directions of a plurality of directive beams that will be radiated through the antenna array. The memory 130 or 220 may store instructions of, at execution, enabling the processor 120 or 230 to control the antenna array to radiate the respective plurality of directive beams in radiation directions corresponding to mutually different times, on the basis of the information about the radiation directions of the plurality of directive beams. The information about the radiation directions of the plurality of directive beams may be acquired by hexagonally providing coverage regions covered by the respective plurality of directive beams, and providing the number of beam sets wherein the coverage regions covered by the plurality of directive beams are combined to include a target coverage region that the electronic device intends to cover, and on the basis of the provided number of beam sets, setting the number of the plurality of directive beams and the radiation directions of the plurality of directive beams.

According to various embodiments, the information about the radiation directions of the plurality of directive beams may be set by an external device, and the electronic device may acquire the information about the radiation directions of the plurality of directive beams from the external device.

According to various embodiments, the instructions may enable the at least one processor to obtain a shadow area resulting from the radiation of the plurality of directive beams, and set a radiation direction of at least one beam that will be additionally radiated to decrease the shadow area.

According to various embodiments, the instructions may enable the at least one processor to obtain an overlapped region resulting from the radiation of the plurality of directive beams, and alter a radiation direction of at least one beam among the plurality of directive beams to decrease the overlapped region.

According to various embodiments, the target coverage region may be expressed as a partial region on a hemisphere distant a first distance away centering on the antenna array, and the target coverage region may be expressed by a position of the antenna array and a target coverage angle formed with both end points of the target coverage region.

According to various embodiments, a unitary elevation angle indicating an interval between beam sets may be set on the basis of information about beam widths of the plurality of directive beams, and the number of beam sets may be set as an integer most approximate to a value dividing the target coverage angle by the unitary elevation angle.

According to various embodiments, the unitary elevation angle ($\beta$) may be set based on an expression $$\beta = 2 * \tan^{-1}\left(\frac{\sqrt{3}}{2} * \tan\left(\frac{\alpha}{2}\right)\right)$$ ($\alpha$ denotes a beam width).

According to various embodiments, in response to the number of beam sets being set as N (below, the N number of beam sets are denoted as the first beam set, . . . , the N th beam set), the number of the plurality of directive beams is set as 3N(N+1)+1.

According to various embodiments, in response to the number of beam sets being provided as N (below, the N number of beam sets are denoted as the first beam set, . . . , the Nth beam set), the nth beam set among the first beam set to Nth beam set may include the 6n number of directive beams, and the number of the plurality of directive beams may be set by adding additional one directive beam (first beam) to the 3N(N+1) number of directive beams included in the N number of beam sets.

According to various embodiments, radiation directions of the plurality of directive beams may set wherein a coverage region by six directive beams of the first beam set surrounds a hexagon coverage region of the first beam, and a coverage region by the 6n number of directive beams of the nth beam set among the second beam set to Nth beam set surrounds a coverage region by the 6(n−1) number of directive beams of the (n−1)th beam set.

According to various embodiments, radiation directions of the 6n number of directive beams included in the nth beam set among the first beam set to Nth beam set have the same elevation angle, and have mutually different azimuth angles, and a difference of an azimuth angle of a radiation direction between neighboring directive beams among the 6n number of directive beams included in the nth beam set may correspond to a value dividing 360° by 6n.

According to various embodiments, elevation angles of radiation directions of six directive beams of the first beam set may be set to be the same as each other, and have a difference as much as the unitary elevation angle with an elevation angle of a radiation direction of the first beam, and elevation angles of radiation directions of the 6n number of directive beams of the nth beam set among the second beam set to the Nth beam set may be set to be the same as each other, and have a difference as much as the unitary elevation angle with elevation angles of radiation directions of the 6(n−1) number of directive beams of the (n−1)th beam set.

According to various embodiments, the radiation direction of the first beam may be set to become the center of the target coverage region.

According to various embodiments, an elevation angle of the radiation direction of the first beam may be set as 0°, and an azimuth angle may be set as 0°, and the elevation angles of the radiation directions of the 6n number of directive beams included in the nth beam set among the first beam set to the Nth beam set may be set as n times the unitary elevation angle, and the azimuth angle may be set as one of angles provided as one to 6n times or one to (6n−1) times the unitary azimuth angle dividing 360° by 6n.

According to various embodiments, an electronic device (e.g., the electronic device 101) may include an antenna array configured to include a plurality of conductive members, a wireless communication circuitry configured to be electrically connected with the plurality of conductive members, and transmit and/or receive a signal having a frequency between 3.5 GHz and 70 GHz, and provide a directive beam along a virtual axis extended in a selected direction, by using the antenna array, where the directive beam is distant a first distance away from the antenna array along the virtual axis, and has a half power beam width (HPBW) on a virtual plane vertical to the axis, at least one processor configured to be operatively connected to the wireless communication circuitry, and a memory configured to be operatively connected with the at least one processor. The memory may store instructions of, at execution, enabling the processor to, by using the antenna array, at different times, generate: a first beam formed along a first virtual axis extended in a first direction, and having the HPBW on a first virtual plane vertical to the first virtual axis, at a first distance from the array; a second beam formed along a second virtual axis extended in a second direction, and having the HPBW on a second virtual plane vertical to the second virtual axis, at a first distance from the array, where the second virtual axis forms a first elevation angle with the first virtual axis; a third beam formed along a third virtual axis extended in a third direction, and having the HPBW on a third virtual plane vertical to the third virtual axis, at the first distance from the array, where the third virtual axis forms a second elevation angle with the first virtual axis; a fourth beam formed along a fourth virtual axis extended in a fourth direction, and having the HPBW on a fourth virtual plane vertical to the fourth virtual axis, at the first distance from the array, where the fourth virtual axis forms a third elevation angle with the first virtual axis; a fifth beam formed along a fifth virtual axis extended in a fifth direction, and having the HPBW on a fifth virtual plane vertical to the fifth virtual axis, at the first distance from the array, where the fifth virtual axis forms a fourth elevation angle with the first virtual axis; a sixth beam formed along a sixth virtual axis extended in a sixth direction, and having the HPBW on a sixth virtual plane vertical to the sixth virtual axis, at the first distance from the array, where the sixth virtual axis forms a fifth elevation angle with the first virtual axis; and a seventh beam formed along a seventh virtual axis extended in a seventh direction, and having the HPBW on a seventh virtual plane vertical to the seventh virtual axis, at the first distance from the array, where the seventh virtual axis forms a sixth elevation angle with the first virtual axis.

According to various embodiments, in response to the immediately adjacent axes among the second virtual axis to the seventh virtual axis being connected mutually, the second virtual axis to the seventh virtual axis may form a virtual hexagon, when viewed from the top of the first virtual plane.

According to various embodiments, the first axis may be positioned at the center of the hexagon when viewed from the top of the first virtual plane.

According to various embodiments, a second distance between a first intersection point of the first virtual plane and the first virtual axis and a second intersection point of the second virtual plane and the second virtual axis may be less than the HPBW in size.

Below, a method for setting a radiation direction of a beam to radiate in the aforementioned electronic device 101 is described.

The method for setting the radiation direction of the beam may be executed and set in itself after receiving a related parameter in the electronic device 101 as well, and may be set through a method described later by another device, not the electronic device 101, wherein each codeword is provided in the form of a codebook representing a radiation direction of a beam and then is stored in or forwarded to the electronic device 101 and thus the electronic device 101 may set a radiation direction of a beam according to the codebook as well. Accordingly, a subject of the method described later may be the electronic device 101 as well, but may be any other device which can execute an algorithm for performing the method described later as well.

Figure 5:
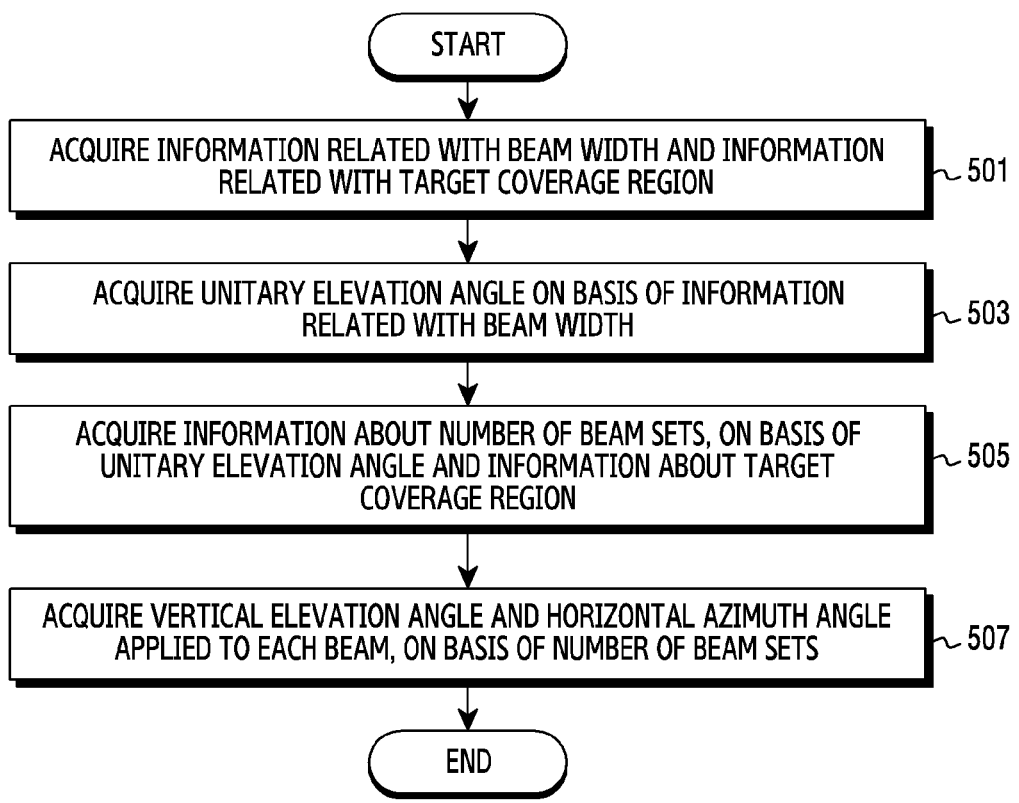
FIG. 5 illustrates a flowchart in which an electronic device sets a radiation direction of a beam to form, in a wireless communication system according to various embodiments.

FIG. 5 illustrates a flowchart in which the electronic device 101 sets a radiation direction of a beam to form in a wireless communication system according to various embodiments. An operation subject of the flowchart exemplified in FIG. 5 may be an electronic device (e.g., the electronic device 101 of FIG. 1), a constituent element (e.g., the processor 120 of FIG. 1) of the electronic device 101, or a device (e.g., the server 108 of FIG. 1, the electronic device 104 of FIG. 1, a base station, a management device, or an arbitrary computer) capable of executing an algorithm of the flowchart.

Referring to FIG. 5, in accordance with various embodiments, in operation 501, the operation subject may set information about a beam width that the electronic device 101 can form, and information about a target coverage region. Here, the information about the beam width may be denoted as a half power beam width (HPBW).

In accordance with another embodiment, the information about the target coverage region may include distance information from the electronic device 101 to the target coverage region, information about a center point of the target coverage region, or information about a target coverage angle. The distance information up to the target coverage region and the information about the center point of the target coverage region may simultaneously indicate one point in a spherical coordinate system as well. For example, when it is set with a coordinate of (10 m, 0°, 0°), the operation subject of executing the algorithm of the flowchart of FIG. 5 may identify that a distance from the electronic device 101 to the target coverage region is equal to 10 m. Also, the electronic device 101 may identify that the center point of the target coverage region corresponds to a zenith point of a hemisphere having a radius of 10 m and centering on a position of the electronic device 101. Referring to FIG. 4A, the center point of the target coverage region 420 may correspond to the zenith 411. The target coverage angle 421 may include information indicating a specific angle. For example, in response to the target coverage angle indicating 30°, the target coverage region may include all regions from the target coverage center point to a point slanted down by 30°.

In operation 503, the operation subject may acquire a unitary elevation angle value on the basis of the information related with the beam width. The unitary elevation angle value may correspond to a basic unit of an elevation angle value which is applied every beam set. For example, a first beam set may be arranged to be slanted by a unitary elevation angle. For another example, a second beam set may be arranged to be slanted by two times the unitary elevation angle. For further another example, a third beam set may be arranged to be slanted by three times the unitary elevation angle. For instance, an angle at which beams included in the Nth beam set are slanted with respect to a z axis may correspond to an N times the unitary elevation angle.

In various embodiments, the unitary elevation angle value may be provided on the basis of the information related with the beam width. FIG. 6A to FIG. 6D illustrate an example of acquiring a unitary elevation angle in a wireless communication system according to various embodiments.

Figure 6A:
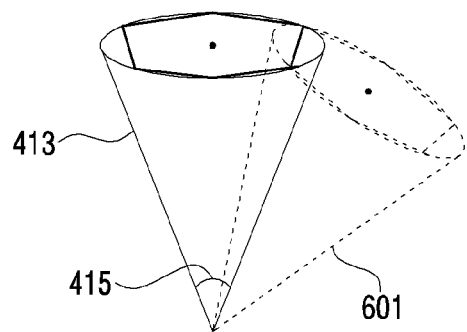
FIG. 6A to FIG. 6D illustrate an example of acquiring a unitary elevation angle in a wireless communication system according to various embodiments.

The operation subject of executing the algorithm of the flowchart of FIG. 5 may provide the unitary elevation angle value on the basis of the information about the beam width acquired in operation 501 and a geometrical relation expression related with an equilateral hexagon. Referring to FIG. 6A for acquisition of the unitary elevation angle, the beam width 415 may be expressed as α°. Neighboring two beams among a plurality of beams included in a beam set may be arranged wherein at least partial regions thereof are overlapped. Referring to FIG. 4A, at least a partial region covered by a beam (for example, the first beam 413) radiated from the electronic device 101 may be substantially a shape of a circle. Because the at least partial region covered by the beam is the shape of the circle, at least parts of regions covered by neighboring two beams among a plurality of beams included in a beam set that the electronic device 101 can radiate may be overlapped. According to an embodiment of the present disclosure, a region covered by one beam may be provided in a hexagon or equilateral hexagon internally touching with the shape of the circle. The operation subject may provide a radiation direction of a beam wherein sides of hexagon regions covered by neighboring two beams get in touch with each other. According to this, at least parts of the regions covered by the neighboring two beams may be substantially overlapped, but a null space covered by no beams does not exist in a coverage region and simultaneously, an overlapped portion may be minimized. In various embodiments below, a description is made on the assumption that the coverage region is provided in the equilateral hexagon, but an embodiment is not necessarily limited to this, and the coverage region may be provided in the equilateral hexagon or the hexagon.

For example, a coverage region covered by a plurality of beams included in a first beam set may be arranged to be adjacent to one side of an equilateral-hexagon coverage region provided as the region covered by the first beam 413. A second beam 601 may correspond to one beam among a plurality of beams included in a first beam set. A region covered by the second beam 601 may be substantially a circle, but may be provided as an equilateral hexagon. Accordingly to this, referring to FIG. 6B, each of an angle 610 and an angle 615 may denote an angle which is formed between facing two sides of equilateral hexagon regions covered by the first beam 413 and the second beam 601, and the origin 401. Because the beam width 415 denotes an angle which is formed between the origin 401 and both end points of a diameter of a region of a circle covered by the first beam 413, the angle 610 or the angle 615 may be less than the beam width 415. Referring to FIG. 6C, an equilateral hexagon region provided to be covered by the first beam 413 and an equilateral hexagon region provided to be covered by the second beam 601 may correspond to equilateral hexagons of the same size. Accordingly, an angle 620 at which the second beam 601 is slanted with respect to the first beam 413 may have the same size as the angle 610 or the angle 615. For example, referring to FIGS. 6B and 6C, the angle 620 at which the second beam 601 is slanted with respect to the first beam 413 may have the same size as the angles 610 and 615 formed with facing two sides of the equilateral hexagon and the origin 401. Referring to FIG. 6D, each of sizes of $R_O$, $R_H$, and R may be acquired as below.

$$R_O = R * \tan\left(\frac{\alpha}{2}\right) \quad \text{Equation 1}$$

$$R_H = R * \tan\left(\frac{\beta}{2}\right) \quad \text{Equation 2}$$

$$R = \frac{R_O}{\tan\left(\frac{\alpha}{2}\right)} \quad \text{Equation 3}$$

Figure 6B:
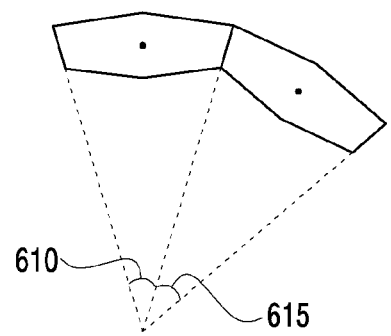
Figure 6C:
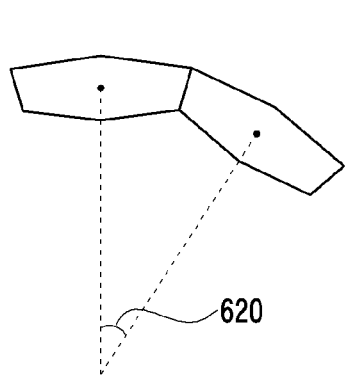
Figure 6D:
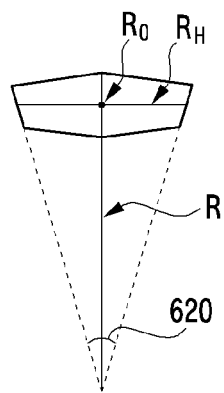

In Equation 1 to Equation 3 above, the α may correspond to the angle 415 of FIG. 6A, and the β may correspond to the angle 610, 615, or 620 of FIGS. 6B to 6C. In accordance with another embodiment, the α may correspond to a beam width, and the β may correspond to a unitary elevation angle.

If using Equation 2 and Equation 3 above, the unitary elevation angle may be expressed as below.

$$\beta = 2 * \tan^{-1}\left(\frac{R_H}{R}\right) \quad \text{Equation 4}$$

If using a geometrical relation $$\left(R_H = \left(\frac{\sqrt{3}}{2}\right) * R_O\right)$$

of an equilateral hexagon between the $R_H$ and the $R_O$, the unitary elevation angle may be expressed as a function of a beam width.

$$\beta = 2 * \tan^{-1}\left(\frac{\frac{\sqrt{3}}{2} * R_O}{\frac{R_O}{\tan\left(\frac{\alpha}{2}\right)}}\right) = 2 * \tan^{-1}\left(\frac{\sqrt{3}}{2} * \tan\left(\frac{\alpha}{2}\right)\right) \quad \text{Equation 5}$$

The operation subject of the flowchart of FIG. 5 may provide the unitary elevation angle value, by using the information about the beam width by using Equation 5 above.

In operation 505, the operation subject may acquire information about the number of beam sets, on the basis of information related with the unitary elevation angle value and the target coverage region. In accordance with an embodiment, the operation subject may identify information about a target coverage angle among the information related with the target coverage region. The information about the target coverage angle may be acquired from an external electronic device (for example, a base station). By identifying the information about the target coverage angle, the operation subject may, at beamforming, identify a maximal angle which can be arranged to be slanted with respect to a z axis. For example, in response to the target coverage angle being 50°, in response to performing beamforming with being slanted by 60° with respect to the z axis in excess of 50° being the target coverage angle, the processor 120 may identify that a beamformed beam just only covers a region external to the target coverage region, and cannot cover the target coverage region.

In accordance with various embodiments, the operation subject may acquire the information about the number of beam sets, on the basis of the information about the target coverage angle and the information about the unitary elevation angle value. By dividing the target coverage angle by the unitary elevation angle value, the operation subject may acquire the information about the number of beam sets. When the number of beam sets is equal to N, an equation for acquiring the N, is given as below.

$$N = \left[\frac{\theta_{tar}}{\beta}\right] \qquad \text{Equation 6}$$

The [x] may correspond to an operator for acquiring an integer value most approximate to x, and the $\theta_{tar}$ may correspond to the target coverage angle, and the $\beta$ may correspond to the unitary elevation angle value. For example, when the target coverage angle is 50°, and the unitary elevation angle is 26°, $$N = \left[\frac{\theta_{tar}}{\beta}\right] = \left[\frac{50}{26}\right] = [1.916] = 2$$

may be given. The operation subject may acquire information indicating that the number of beam sets is equal to 2. The operation subject may identify the number of a plurality of beams for covering the target coverage region on the basis of the information about the number of beam sets. For example, when the number of beam sets is equal to 2, to cover the target coverage region, the operation subject may provide the first beam 413, a first beam set arranged around the first beam 413, and a second beam set arranged around the first beam set.

In accordance with various embodiments, to cover the target coverage region, the operation subject may identify one number, on the basis of the information about the number of beam sets. The electronic device 101 may perform as many beam sweeping or beam training as the identified number. For instance, the electronic device 101 may scan the entire target coverage region, through beamforming for forming an individual beam included in the plurality of beams. For example, after providing the first beam 413, by sequentially providing a plurality of beams (e.g., a second beam to a seventh beam) included in a first beam set, the electronic device 101 may perform beam sweeping or beam training for at least part of the target coverage region. If the number of the plurality of beams for covering the target coverage region is equal to M, an equation for acquiring the M is given as below.

$$M=3*N*(N+1)+1 \qquad \text{Equation 7}$$

The N may correspond to the number of beam sets required to cover the target coverage region.

For example, when the number of beam sets is equal to 2, the operation subject may identify (3*2*3+1=19) that the target coverage region can be covered, by using the first beam 413, a first beam set (i.e., second beam to seventh beam) including six beams, and a second beam set (i.e., eighth beam to nineteenth beam) including twelve beams.

In operation 507, the operation subject may acquire a vertical elevation angle and a horizontal azimuth angle that are applied to each beam set, on the basis of the number of beam sets. By identifying the vertical elevation angle and the horizontal azimuth angle applied to each beam set, the operation subject may identify a point on the hemisphere 400 of each of the plurality of beams required to cover the target coverage region.

In accordance with an embodiment, by using the acquired number of beam sets, the operation subject may provide a vertical elevation angle allocated (or applied) to each beam set. On the basis of the unitary elevation angle value, the operation subject may provide the vertical elevation angle value applied to each beam set. For example, a first beam set may be arranged on the slant to form an angle of one times the unitary elevation angle with the z axis. The six beams (i.e., the second beam to the seventh beam) included in the first beam set may be all tilted down by an angle of the unitary elevation angle and be radiated. For example, when the unitary elevation angle is equal to 30°, the second beam to the seventh beam included in the first bean set may be arranged to be radiated with being slanted by 30° with respect to the first beam 413.

By using the acquired number of beam sets, the operation subject may identify a horizontal azimuth angle applied to each of a plurality of beams included in a beam set. For example, when the number of beam sets is equal to 1, the operation subject may identify six azimuth angles (0°, 60°, 120°, 180°, 240°, and 300°) for the six beams included in the first beam set.

On the basis of the acquired azimuth angle information and the acquired information about the vertical elevation angle, the operation subject may provide radiation coordinates of a plurality of beams included in a beam set. For example, when the acquired unitary elevation angle value is equal to 300, the operation subject may identify that all beams (i.e., six beams) included in a first beam set have an elevation angle of 1×30°=30°, and all beams (i.e., twelve beams) included in a second beam set have an elevation angle of 2×30°=60°. When the information about the number of beam sets is equal to 2, the operation subject may allocate azimuth angles of 0°, 60°, 120°, 180°, 240°, and 300°, to the second beam to the seventh beam included in the first beam set, respectively. The operation subject may allocate azimuth angles of 0°, 30°, 60°, 90°, . . . 300°, and 330°, to the eighth beam to the nineteenth beam included in the second beam set, respectively.

The operation subject may store set information about a radiation direction of a beam, as a codebook in the memories 130 and 220. According to various embodiments, when coordinates (can be expressed with an elevation angle and an azimuth angle) of a plurality of beams that the electronic device 101 will radiate are set, the operation subject may provide a codeword corresponding to a radiation direction of each beam, and provide a codebook which includes each codeword and information about the radiation direction corresponding to the each codeword. In response to the codebook being provided by the processor 120 of the electronic device 101, the codebook may be stored in the memory 130 or 220 of the electronic device 101, and in response to the codebook being provided by an external device, codebook information may be acquired through communication with the external device (e.g., a base station) and be stored in the memory 130 or 220. The electronic device 101 may recognize radiation directions of a plurality of beams transmitted at mutually different times according to the codebook stored in the memory 130 or 220. By radiating the plurality of beams of the codebook at different times, the electronic device 101 may cover the entire coverage region to cover.

Figure 7:
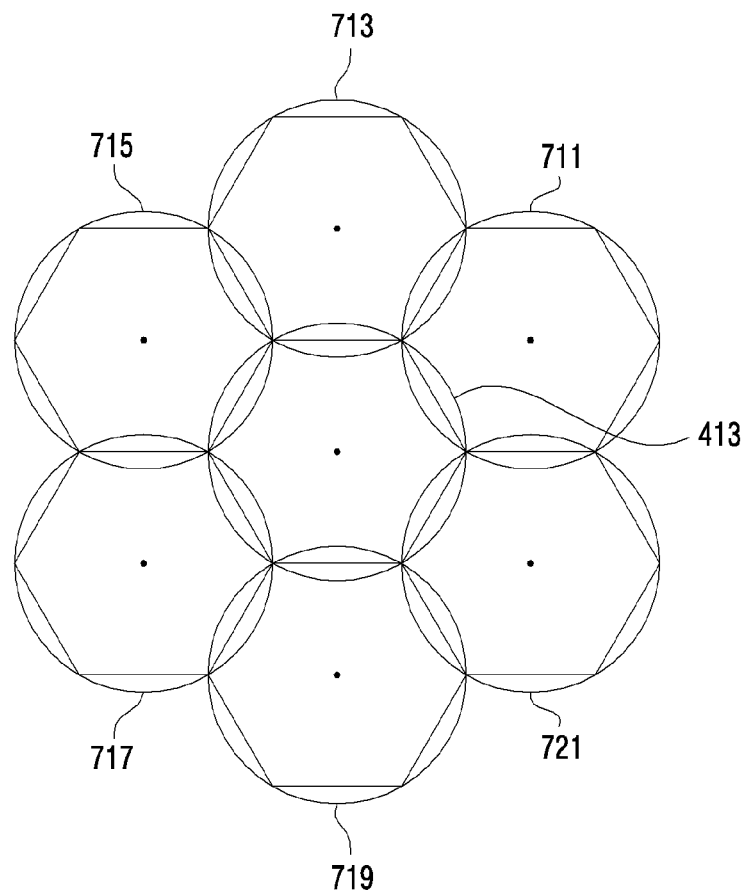
FIG. 7 illustrates an example of a radiation direction of a beam to form, in a wireless communication system according to various embodiments.

FIG. 7 illustrates an example of a radiation direction of a beam to form, in a wireless communication system according to various embodiments.

Referring to FIG. 7, in various embodiments, the electronic device 101 may radiate the first beam 413 set according to the flowchart of FIG. 5 and a plurality of beams belonging to a first beam set. For example, the first beam 413 may be beamformed to be radiated toward the zenith point 411 of the hemisphere 400 of FIG. 4A. The first beam set may include a second beam 711, a third beam 713, a fourth beam 715, a fifth beam 717, a sixth beam 719, and/or a seventh beam 721. Referring to FIG. 7, in response to center points of regions covered by the second beam 711 to the seventh beam 721 being connected, it may form substantially a hexagon or equilateral hexagon. An azimuth angle of 0° may be allocated to the second beam 711 included in the first beam set, and an azimuth angle of 60° may be allocated to the third beam 713, and an azimuth angle of 120° may be allocated to the fourth beam 715, and an azimuth angle of 180° may be allocated to the fifth beam 717, and an azimuth angle of 240° may be allocated to the sixth beam 719, and an azimuth angle of 300° may be allocated to the seventh beam 721.

In accordance with an embodiment, the region covered by the second beam 711 may be adjacent with the region covered by the third beam 713, and the region covered by the second beam 711 may be at least partially overlapped with each of the region covered by the third beam 713 and the region covered by the first beam 413. The region covered by the third beam 713 may be at least partially overlapped with each of the region covered by the second beam 711 and the region covered by the first beam 413. The region covered by the first beam 413 may be at least partially overlapped with the region covered by the second beam 711 and the region covered by the third beam 713.

In accordance with another embodiment, in response to the center point of the region covered by the first beam 413, the center point covered by the second beam 711 and the center point covered by the third beam 713 being connected, it may form substantially an equilateral triangle.

In accordance with various embodiments, the processor 120 of the electronic device 101 may perform beam training or beam sweeping, on the basis of the first beam 413 and the first beam set. For example, the processor 120 may form the first beam 413 to be radiated toward the center point 401 of the target coverage region. Thereafter, the processor 120 may form each of the second beam 711 to seventh beam 721 included in the first beam set, to be radiated in a set direction of each beam at different times. For example, the second beam 711 may be provided after a specified time from provision of the first beam 413. For example, the third beam 713 may be provided after a specified time from a time of provision of the second beam 711. For instance, the second beam 711 to seventh beam 721 included in the first beam set may be formed at different times, respectively.

Figure 8:
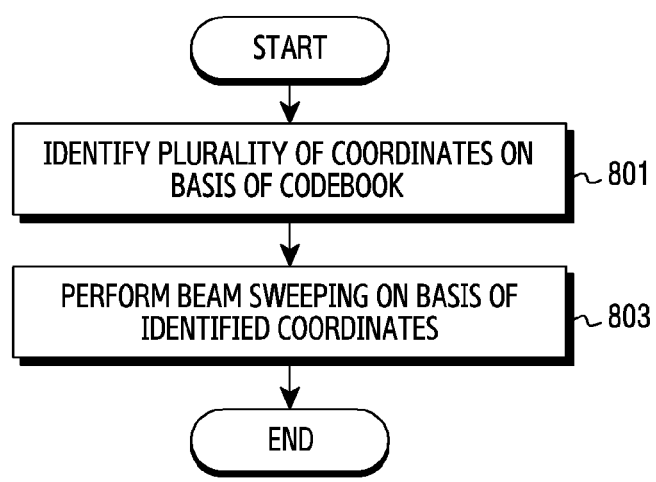
FIG. 8 illustrates a flowchart of performing, by an electronic device, beamforming in a wireless communication system according to various embodiments.

FIG. 8 illustrates a flowchart of performing, by the electronic device 101, beamforming in a wireless communication system according to various embodiments. An operation subject of the flowchart exemplified in FIG. 8 may be an electronic device (e.g., the electronic device 100 of FIG. 1) or a constituent element (e.g., the processor 120 of FIG. 1) of the electronic device 101.

Referring to FIG. 8, in operation 801, the processor 120 of the electronic device 101 may identify coordinates of radiation directions of a plurality of beams, on the basis of a codebook. The codebook may denote a codebook that is provided to have a codeword corresponding to information about the radiation direction of the beam to form through beamforming, which is set according to the operation of the flowchart illustrated in FIG. 5. For example, the processor 120 may recognize that the number of beam sets is equal to 1, on the basis of the codebook, and may identify coordinates of radiation directions of a first beam and six beams (e.g., a second beam to a seventh beam) included in a first beam set. For another example, the processor 120 may recognize that the number of beam sets is equal to 2, and may identify that a first beam, a first beam set, and a second beam set are required for scanning a target coverage region. For further another example, the processor 120 may identify coordinates of radiation directions of nineteen beams (e.g., a first beam, a second beam to seventh beam included in a first beam set, and an eighth beam to nineteenth beam included in a second beam set).

In operation 803, the processor 120 of the electronic device 101 of various embodiments may perform beam sweeping on the basis of the identified coordinates. The processor 120 may perform beamforming of the first beam to seventh beam. The processor 120 may form a plurality of beams (for example, the first beam 413 to the seventh beam) to be radiated in a set direction on the basis of the coordinates identified in operation 801. By providing the beams radiated to the identified coordinates, the processor 120 may scan the target coverage region.

Figure 9A:
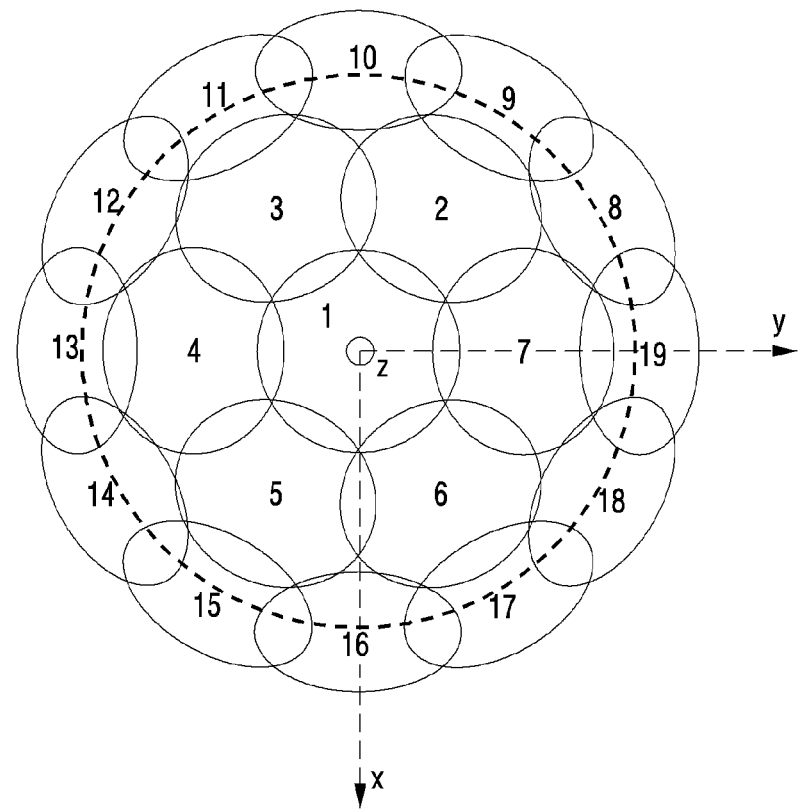
FIG. 9A to FIG. 9B illustrate a result of performing beamforming in a wireless communication system according to various embodiments.
Figure 9B:
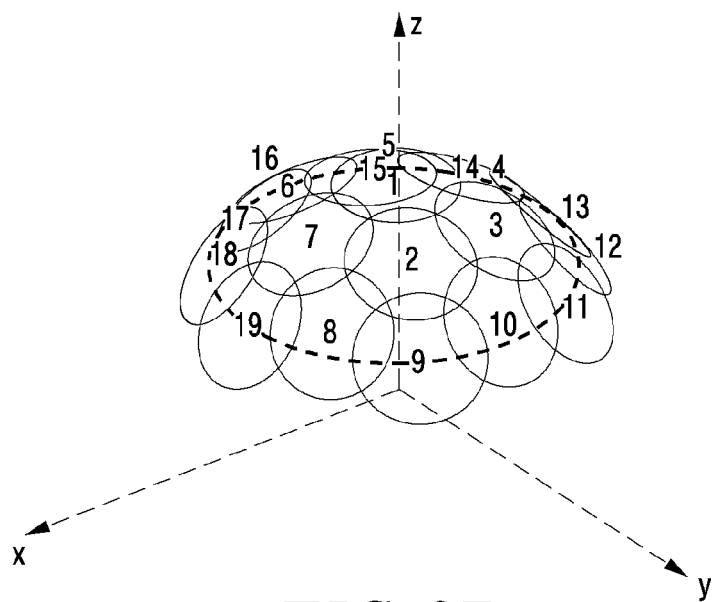

FIG. 9A to FIG. 9B illustrate a result of performing, by the electronic device 101, beamforming in a wireless communication system according to various embodiments.

Referring to FIG. 9A, the electronic device 101 may acquire information about a beam width. The information about the beam width may indicate an angle $\alpha=33°$. On the basis of the information about the beam width, the electronic device 101 may acquire a value of a unitary elevation angle. Referring to Equation 5 above, the electronic device 101 may acquire $$\beta = 2 * \tan^{-1}\left(\frac{\sqrt{3}}{2} * \tan\left(\frac{33}{2}\right)\right) = 28.78°$$

as the unitary elevation angle. The electronic device 101 may acquire the number of beam sets, on the basis of the acquired value of the unitary elevation angle and a target coverage angle of a target coverage region. The electronic device 101 may acquire the number of beam sets as $$N = \left\lceil \frac{50}{28.78} \right\rceil = \lceil 1.737 \rceil = 2.$$

Accordingly, the electronic device 101 may set a first beam going toward a center point of the target coverage region, a first beam set including six beams arranged around the first beam, and a second beam set including twelve beams arranged around the first beam set, and store the same as a codebook. Here, it has been described that the electronic device 101 sets the beams to form, but this setting may be made by an external device and the setting result may be stored in the memory 130 or 220 of the electronic device 101 in the form of a codebook.

Referring to FIG. 9B, the electronic device 101 may perform beam sweeping by using the plurality of beams whose radiation directions are arranged on the basis of an equilateral hexagon which are set according to the description of FIG. 9A, thereby minimizing a mutually overlapped region, and minimizing the number of beams required for covering the target coverage region.

Figure 10:
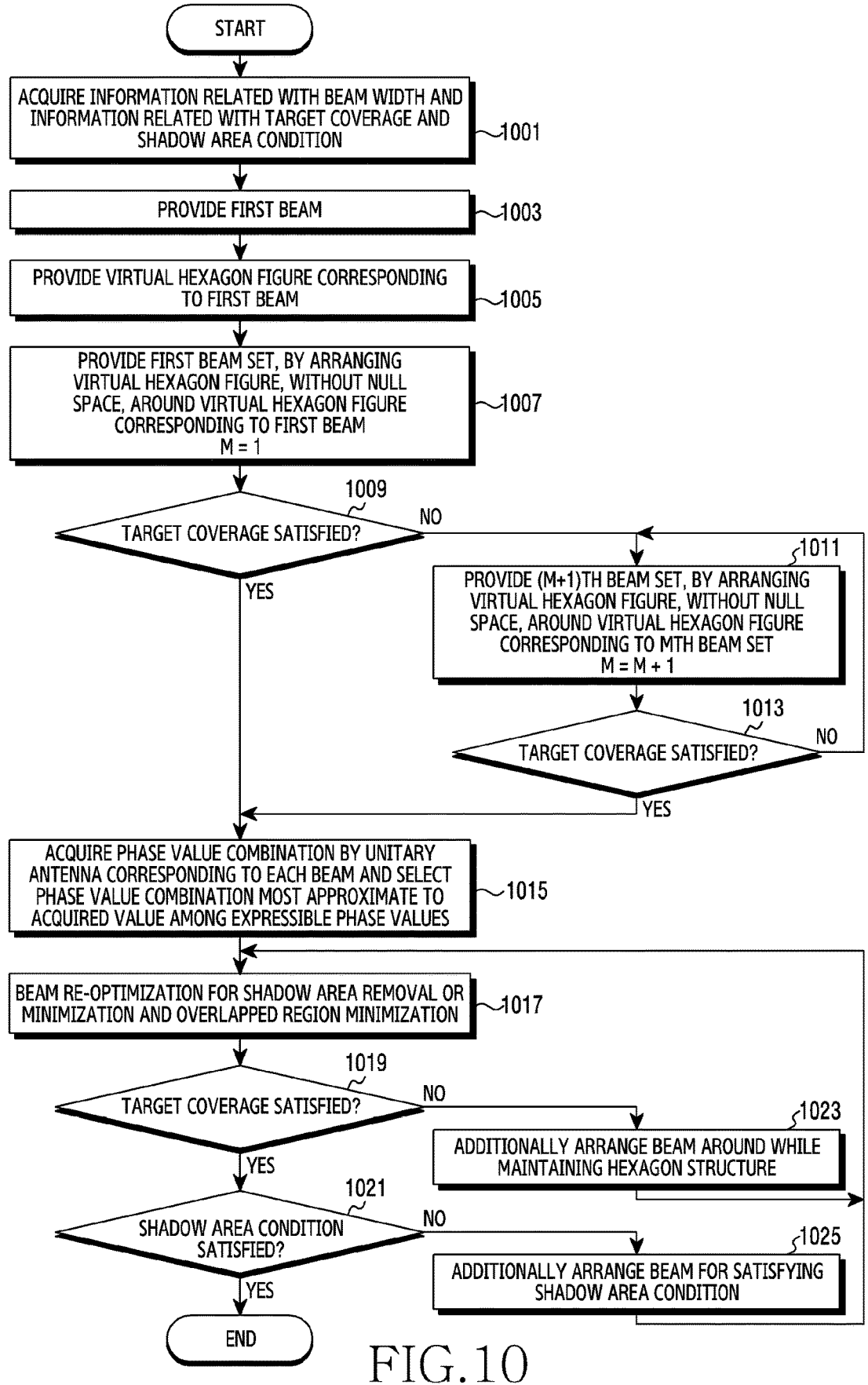
FIG. 10 illustrates a flowchart in which an electronic device sets a radiation direction of a beam to form, in a wireless communication system according to various embodiments.

FIG. 10 illustrates a flowchart in which the electronic device 101 sets a radiation direction of a beam to form in a wireless communication system according to various embodiments. An operation subject of the flowchart exemplified in FIG. 10 may be an electronic device (e.g., the electronic device 100 of FIG. 1), a constituent element (e.g., the processor 120 of FIG. 1) of the electronic device 101, or a device (e.g., the server 108 of FIG. 1, the electronic device 104 of FIG. 1, a base station, a management device or an arbitrary computer) capable of executing an algorithm of the flowchart of FIG. 10.

The flowchart of FIG. 10 may include providing whether to arrange an additional beam according to a shadow area condition.

In accordance with various embodiments, in operation 1001, the processor 120 of the electronic device 101 may acquire information related with a beam width and information related with a target coverage region and a shadow area condition. In accordance with various embodiments, a shadow area may denote an area where the performance of a beam radiated and reaching a coverage region is a threshold or less, because of an obstacle existing between the target coverage region and the electronic device 101.

In accordance with various embodiments, in operation 1003, the processor 120 of the electronic device 101 may provide a first beam. For example, the provided first beam may correspond to a beam which is provided toward the center of the target coverage region. The providing of the first beam may refer to the providing of the first beam 413 illustrated in FIG. 7.

In accordance with various embodiments, in operation 1005, the processor 120 of the electronic device 101 may provide a virtual hexagon figure corresponding to a coverage region of the first beam. Referring to FIG. 7, the virtual hexagon figure may denote a hexagon internally touching with a substantial circular coverage region of the first beam 413.

In accordance with various embodiments, in operation 1007, the processor 120 of the electronic device 101 may provide a first beam set, by arranging a virtual hexagon figure, without a null space, around the virtual hexagon figure corresponding to the coverage region of the first beam. For example, the virtual hexagon figure may be a coverage region of a beam included in the first beam set. Referring to FIG. 7, the first beam set arranging the coverage region around the hexagon figure of the first beam may include the second beam 711 to the seventh beam 721. In accordance with various embodiments, by arranging the virtual hexagon figure of the first beam set around the virtual hexagon figure of the first beam, the processor 120 may minimize a region overlapped between the first beam and the first beam set, and prevent the provision of the null space.

In accordance with various embodiments, in operation 1009, the processor 120 may provide whether target coverage is satisfied. The processor 120 may provide whether a region covered by virtual hexagon figures, which indicate coverage regions of the first beam and a plurality of beams (e.g., the second beam to the seventh beam) included in the first beam set, includes a target coverage region. In response to the region covered by the virtual hexagon figures not including the target coverage region, the processor 120 may perform operation 1011 in order to arrange an additional beam set. In response to the region covered by the virtual hexagon figures including the target coverage region, the target coverage region may be covered without arranging the additional beam set, so the processor 120 may perform operation 1015.

In accordance with various embodiments, in operation 1011, the processor 120 may arrange virtual hexagon figures, without a null space, around virtual hexagon figures corresponding to an Mth beam set, and provide a (M+1)th beam set around the Mth beam set. Respective beams included in the (M+1)th beam set may include the virtual hexagon figures. The respective beams included in the (M+1)th beam set may be arranged to surround the virtual hexagon figures forming the Mth beam set.

In accordance with various embodiments, in operation 1013, the processor 120 may provide whether target coverage is satisfied. The processor 120 may identify whether a region covered by a plurality of virtual hexagons formed with the (M+1)th beam set includes the target coverage region. In response to the region covered by the plurality of virtual hexagons including the target coverage region, the processor 120 may scan the target coverage region with the first beam and the plurality of beams included in the first beam set to the (M+1)th beam set. In response to the target coverage region being satisfied, the processor 120 may perform operation 1015. In response to the target coverage region not being satisfied, the processor 120 may again perform operation 1011, and arrange an (M+2)th beam set.

Setting the direction of the beam that the electronic device 101 will radiate according to operation 1001 to operation 1013 may be another embodiment of the flowchart of setting the radiation direction of the beam of FIG. 5. Accordingly, as an example of the operation subject of operations 1001 to 1013, the processor 120 has been proposed, but an embodiment is not limited to this, and any device capable of executing the algorithm of the flowchart of operations 1001 to 1013 may be operated as the operation subject. And, the beams arranged or set according to the flowchart of operations 1001 to 1013 may be stored in the memory 130 or 220 of the electronic device 101 in the form of a codebook.

In accordance with various embodiments, in operation 1015, the processor 120 may acquire a combination of phase values by unitary antenna for radiating each beam in a set direction. In response to the acquired phase value not being a phase value expressible by the control of the processor 120, the processor 120 may select a combination of phase values most approximate to the acquired phase value among the expressible phase values. With reference to the codebook, the processor 120 may acquire a setting value of a phase shifter by unitary antenna corresponding to each beam. In accordance with various embodiments, at least a part (for example, a boundary area of the target coverage region) of the target coverage region may fail to form a beam, even if the setting value of the phase shifter of the electronic device 101 is adjusted. That is because the target coverage region may be positioned outside greater than a maximum tilting angle to perform on the basis of the phase shifter. In this case, the processor 120 may set a phase shifter value to form a beam at a tilting angle closest to the target coverage region among phase values at which tilting is possible.

In accordance with various embodiments, in operation 1017, the processor 120 may perform beam re-optimization for shadow area removal or minimization and overlapped area minimization. The processor 120 may perform beam sweeping or beam training on the basis of the plurality of beams that are set according to operation 1001 to operation 1013. On the basis of the result thereof, the processor 120 may provide a shadow area or an overlapped area. For example, at beam training or beam sweeping, the processor 120 may provide the shadow area or the overlapped area, based on a received strength. In response to obtaining the shadow area, the processor 120 may arrange a plurality of additional beams around the shadow area. The shadow area may be provided because a beam cannot go through a building due to the linearity of a beam of a millimeter wave band. To solve the shadow area, the processor 120 may arrange an additional beam around the shadow area. In response to obtaining the overlapped region, the processor 120 may remove at least one beam, based on ambient beam arrangement of the overlapped region. In accordance with various embodiments, the additional beam arranged around the shadow area may not be based on a hexagon. In accordance with an embodiment, to minimize or remove the shadow area and simultaneously minimize the overlapped region, the processor 120 may alter a radiation direction of at least one beam among a plurality of beams. In accordance with another embodiment, to minimize the shadow area, the processor 120 may arrange an additional beam besides the plurality of beams.

In accordance with various embodiments, in operation 1019, the processor 120 may provide whether a target coverage region is satisfied. The processor 120 may provide whether a region covered by the plurality of beams altered on the basis of the result of the beam re-optimization performed in operation 1017 includes the target coverage region. In accordance with various embodiments, operation 1019 may refer to operation 1009 or operation 1015. In response to the target coverage region not being satisfied, in operation 1023, the processor 120 may additionally arrange a beam around while maintaining the hexagon structure.

In accordance with various embodiments, in operation 1021, the processor 120 may provide whether a shadow area condition is satisfied. For example, the shadow area condition may be provided on the basis of whether a ratio of a region provided as the shadow area among the target coverage region exceeds a threshold ratio. In response to the shadow area among the target coverage region existing in excess of the threshold ratio, the processor 120 may perform operation 1025, and in response to the shadow area among the target coverage area being less than the threshold ratio, the processor 120 may terminate the procedure.

In accordance with various embodiments, in operation 1025, the processor 120 may additionally form a beam for satisfying the shadow area condition. For example, in response to the shadow area among the target coverage area exceeding 10%, the processor 120 may additionally form a beam. The added beam may include beams which are arranged around the shadow area.

In the aforementioned embodiments, a description has been made in which a radiation direction of a beam is provided on the basis of an equilateral hexagon, but an embodiment is not limited to this. In response to the electronic device 101 forming a beam, the setting of the beam radiation direction based on the equilateral hexagon may not be easy because of an external environment (for example, a dead zone caused by an obstacle) or an internal environment (for example, a maximal phase variation value of a phase shifter). In various embodiments, the electronic device 101 may be configured to set the radiation direction of the beam on the basis of substantially a hexagon or beehive shape, not the equilateral hexagon.

According to various embodiments, a method for setting radiation directions of a plurality of directive beams radiated in an electronic device (e.g., the electronic device 101) may include acquiring information about a target coverage region (e.g., 420) which is expressed as a partial region on a hemisphere (e.g., 400) distant a first distance away centering on an antenna array of the electronic device, and providing, in a hexagon shape, a coverage region covered by a directive beam formed by a wireless communication circuitry and providing the number of beam sets wherein coverage regions covered by a plurality of directive beams formed by the wireless communication circuitry are combined to include the target coverage region, and setting the number of the plurality of directive beams and the radiation direction of each of the plurality of directive beams, on the basis of the provided number of beam sets.

According to various embodiments, the method for setting the radiation directions of the plurality of directive beams radiated in the electronic device (e.g., the electronic device 101) may further include obtaining a shadow area as a result of radiating the plurality of directive beams at mutually different times, and setting a radiation direction of at least one beam that will be additionally radiated to decrease the shadow area.

According to various embodiments, the method for setting the radiation directions of the plurality of directive beams radiated in the electronic device (e.g., the electronic device 101) may obtaining an overlapped region as a result of radiating the plurality of directive beams at mutually different times, and altering a radiation direction of at least one beam among the plurality of directive beams to decrease the overlapped region.

According to various embodiments, acquiring the information about the target coverage region may include acquiring information about a position (e.g., 401) of the antenna array and a target coverage angle (e.g., 421) formed with both end points of the target coverage region.

According to various embodiments, providing the number of beam sets may include acquiring information about beam widths of the plurality of directive beams, and acquiring a unitary elevation angle indicating an interval between the beam sets, on the basis of the beam width, and providing the number of beam sets on the basis of the target coverage angle and the unitary elevation angle.

According to various embodiments, acquiring the unitary elevation angle may include acquiring the unitary elevation angle ($\beta$), based on an expression $$\beta = 2*\tan^{-1}\left(\frac{\sqrt{3}}{2}*\tan\left(\frac{\alpha}{2}\right)\right) \text{ ($\alpha$ denotes a beam width).}$$

According to various embodiments, providing the number of beam sets on the basis of the target coverage angle and the unitary elevation angle may include providing, as the number of beam sets, an integer most approximate to a value dividing the target coverage angle by the unitary elevation angle.

According to various embodiments, setting the number of the plurality of directive beams and the radiation direction of each of the plurality of directive beams on the basis of the provided number of beam sets may include, in response to the number of beam sets being provided as N (below, the N number of beam sets are denoted as the first beam set, . . . , the N th beam set), setting wherein the nth beam set among the first beam set to Nth beam set includes the 6n number of directive beams, and setting the number of the plurality of directive beams by adding additional one directive beam (a first beam) to the 3N(N+1) number of directive beams included in the N number of beam sets.

According to various embodiments, setting the number of the plurality of directive beams and the radiation direction of each of the plurality of directive beams on the basis of the provided number of beam sets may include enabling radiation directions of the 6n number of directive beams included in the nth beam set among the first beam set to the Nth beam set, to have the same elevation angle, and have mutually different azimuth angles, where a difference of an azimuth angle of a radiation direction between neighboring directive beams among the 6n number of directive beams included in the nth beam set corresponds to a value dividing 360° by 6n.

According to various embodiments, setting the number of the plurality of directive beams and the radiation direction of each of the plurality of directive beams on the basis of the provided number of beam sets may include setting wherein the radiation direction of the first beam becomes the center of the target coverage region, setting an elevation angle of the radiation direction of the first beam as 0°, and an azimuth angle of the radiation direction of the first beam as 0°, and setting, as n times the unitary elevation angle, the elevation angles of the radiation directions of the 6n number of directive beams included in the nth beam set among the first beam set to the Nth beam set, and setting the azimuth angle as one of angles provided as one to 6n times or one to (6n−1) times the unitary azimuth angle dividing 360° by 6n.

According to various embodiments, in response to the number (N) of beam sets being provided as 1, setting the number of the plurality of directive beams and the radiation direction of each of the plurality of directive beams on the basis of the provided number of beam sets may include setting the number of the plurality of directive beams to 7, setting wherein the plurality of directive beams are comprised of the first beam and six directive beams (second beam to seventh beam) included in the first beam set, setting a radiation direction of the first beam in a first direction that is the center of the target coverage region, setting a radiation direction of the second beam in a second direction, where an elevation angle of the second direction is set to have a difference as much as the unitary elevation angle with the first direction, setting a radiation direction of the third beam in a third direction, where an elevation angle of the third direction is set to be the same as the elevation angle of the second direction, and an azimuth angle of the third direction is set to have a difference of 60° with the first direction, setting a radiation direction of the fourth beam in a fourth direction, where an elevation angle of the fourth direction is set to be the same as the elevation angle of the second direction, and an azimuth angle of the fourth direction is set to have a difference of 60° with the third direction, setting a radiation direction of the fifth beam in a fifth direction, where an elevation angle of the fifth direction is set to be the same as the elevation angle of the second direction, and an azimuth angle of the fifth direction is set to have a difference of 60° with the fourth direction, setting a radiation direction of the sixth beam in a sixth direction, where an elevation angle of the sixth direction is set to be the same as the elevation angle of the second direction, and an azimuth angle of the sixth direction is set to have a difference of 60° with the fifth direction, and setting a radiation direction of the seventh beam in a seventh direction, where an elevation angle of the seventh direction is set to be the same as the elevation angle of the second direction, and an azimuth angle of the seventh direction is set to have a difference of 60° with the sixth direction.

Methods of embodiments mentioned in the claims or specification of the present disclosure may be implemented in the form of hardware, software, or a combination of the hardware and the software.

In response to being implemented by the software, a computer-readable storage media storing one or more programs (i.e., software modules) may be provided. The one or more programs stored in the computer-readable storage media are configured to be executable by one or more processors of an electronic device. The one or more programs include instructions for enabling the electronic device to execute methods of embodiments stated in the claims or specification of the present disclosure.

These programs (i.e., software modules and/or software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, the program may be stored in a memory that is configured in combination of some or all of them. Also, each configured memory may be included in plural as well.

Also, the program may be stored in an attachable storage device that may access through a communication network such as the Internet, an intranet, a local area network (LAN), a wireless LAN (WLAN) or a storage area network (SAN), or a communication network configured in combination of them. This storage device may connect to a device performing an embodiment of the present disclosure through an external port. Also, a separate storage device on the communication network may connect to the device performing an embodiment of the present disclosure as well.

In the aforementioned concrete embodiments of the present disclosure, constituent elements included in the disclosure have been expressed in the singular form or plural form in accordance with a proposed concrete embodiment. But, the expression of the singular form or plural form is selected suitable to a proposed situation for description convenience, and it is not intended to limit the present disclosure to singular or plural constituent elements. Despite a constituent element expressed in the plural form, the constituent element may be constructed in the singular form, or despite a constituent element expressed in the singular form, the constituent element may be constructed in the plural form.

Meantime, in a detailed description of the present disclosure, a concrete embodiment has been described, but it is undoubted that various modifications are available without departing from the scope of the present disclosure. Therefore, the scope of the present disclosure should not be limited and defined to the described embodiment and should be defined by not only claims described later but also equivalents to these claims.

Although the present disclosure has been described with various embodiments, various changes and modifications may be suggested to one skilled in the art. It is intended that the present disclosure encompass such changes and modifications as fall within the scope of the appended claims

What is claimed is:
1. An electronic device comprising:
an antenna array configured to comprise a plurality of conductive members;
a wireless communication circuitry configured to be electrically connected with the plurality of conductive members, and transmit and/or receive a signal having a frequency between 3.5 Giga Hertz (GHz) and 70 GHz, and form a directive beam radiated in a set direction by using the antenna array;

at least one processor configured to be operatively connected to the wireless communication circuitry; and a memory configured to be operatively connected with the at least one processor, wherein the memory stores information about radiation directions of a plurality of directive beams that will be radiated through the antenna array, wherein the memory stores instructions of, at execution, enabling the at least one processor to control the antenna array to radiate the plurality of directive beams to different radiation directions corresponding to mutually different times, based on the information about the radiation directions of the plurality of directive beams, and wherein the information about the radiation directions of the plurality of directive beams is acquired by:

hexagonally providing coverage regions covered by the plurality of directive beams;

providing a number of beam sets wherein the coverage regions covered by the plurality of directive beams are combined to comprise a target coverage region that the electronic device intends to cover; and based on the provided number of beam sets, setting a number of the plurality of directive beams and the radiation directions of the plurality of directive beams, wherein the plurality of directive beams includes a first beam radiated toward a center point of the target coverage region and a first beam set arranged around the first beam.

2. The electronic device of claim 1, wherein the information about the radiation directions of the plurality of directive beams is set by an external device, and the electronic device acquires the information about the radiation directions of the plurality of directive beams from the external device.

3. The electronic device of claim 1, wherein the instructions enable the at least one processor to obtain a shadow area resulting from the radiation of the plurality of directive beams, and set a radiation direction of at least one beam that will be additionally radiated to decrease the shadow area.

4. The electronic device of claim 1, wherein the instructions enable the at least one processor to obtain an overlapped region resulting from the radiation of the plurality of directive beams, and alter a radiation direction of at least one beam among the plurality of directive beams to decrease the overlapped region.

5. The electronic device of claim 1, wherein the target coverage region is expressed as a partial region on a hemisphere distant a first distance away centering on the antenna array, and the target coverage region is expressed by a position of the antenna array and a target coverage angle formed with both end points of the target coverage region.

6. The electronic device of claim 5, wherein a unitary elevation angle indicating an interval between beam sets is set based on information about beam widths of the plurality of directive beams, and the number of beam sets is set as an integer most approximate to a value dividing the target coverage angle by the unitary elevation angle.

7. The electronic device of claim 6, wherein in response to the number of beam sets being set as N, the number of the plurality of directive beams is set as $3N(N+1)+1$.

8. An electronic device comprising:

an antenna array configured to comprise a plurality of conductive members;

a wireless communication circuitry configured to be electrically connected with the plurality of conductive members, and transmit and/or receive a signal having a frequency between 3.5 GHz and 70 GHz, and provide a directive beam along a virtual axis extended in a selected direction, by using the antenna array, where the directive beam is distant a first distance away from the antenna array along the virtual axis, and has a half power beam width (HPBW) on a virtual plane vertical to the virtual axis;

at least one processor configured to be operatively connected to the wireless communication circuitry; and a memory configured to be operatively connected with the at least one processor, wherein the memory stores instructions of, at execution, enabling the processor to, by using the antenna array, at different times, generate:

a first beam formed along a first virtual axis extended in a first direction, and having the HPBW on a first virtual plane vertical to the first virtual axis, at a first distance from the antenna array;

a second beam formed along a second virtual axis extended in a second direction, and having the HPBW on a second virtual plane vertical to the second virtual axis, at a first distance from the antenna array, where the second virtual axis forms a first elevation angle with the first virtual axis;

a third beam formed along a third virtual axis extended in a third direction, and having the HPBW on a third virtual plane vertical to the third virtual axis, at the first distance from the antenna array, where the third virtual axis forms a second elevation angle with the first virtual axis;

a fourth beam formed along a fourth virtual axis extended in a fourth direction, and having the HPBW on a fourth virtual plane vertical to the fourth virtual axis, at the first distance from the antenna array, where the fourth virtual axis forms a third elevation angle with the first virtual axis;

a fifth beam formed along a fifth virtual axis extended in a fifth direction, and having the HPBW on a fifth virtual plane vertical to the fifth virtual axis, at the first distance from the antenna array, where the fifth virtual axis forms a fourth elevation angle with the first virtual axis;

a sixth beam formed along a sixth virtual axis extended in a sixth direction, and having the HPBW on a sixth virtual plane vertical to the sixth virtual axis, at the first distance from the antenna array, where the sixth virtual axis forms a fifth elevation angle with the first virtual axis; and a seventh beam formed along a seventh virtual axis extended in a seventh direction, and having the HPBW on a seventh virtual plane vertical to the seventh virtual axis, at the first distance from the antenna array, where the seventh virtual axis forms a sixth elevation angle with the first virtual axis.

9. The electronic device of claim 8, wherein, in response to an immediately adjacent axis among the second virtual axis to the seventh virtual axis being connected mutually, the second virtual axis to the seventh virtual axis form a virtual hexagon, when viewed from a top of the first virtual plane.

10. The electronic device of claim 9, wherein the first virtual axis is positioned at a center of the virtual hexagon when viewed from the top of the first virtual plane.

11. The electronic device of claim 10, wherein a second distance between a first intersection point of the first virtual plane and the first virtual axis and a second intersection point of the second virtual plane and the second virtual axis is less than the HPBW in size.

* * * * *